(12) United States Patent
Okawa

(10) Patent No.: US 7,923,940 B2
(45) Date of Patent: Apr. 12, 2011

(54) DISCHARGE LAMP LIGHTING DEVICE AND PROJECTOR

(75) Inventor: Kazuo Okawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 229 days.

(21) Appl. No.: 12/379,296

(22) Filed: Feb. 18, 2009

(65) Prior Publication Data

US 2009/0160348 A1    Jun. 25, 2009

Related U.S. Application Data (63) Continuation of application No. 11/670,752, filed on Feb. 2, 2007, now Pat. No. 7,511,433.

(30) Foreign Application Priority Data

Feb. 10, 2006 (JP) .................................. 2006-033490

(51) Int. Cl.
H05B 37/02 (2006.01)
(52) U.S. Cl. .................. 315/224; 315/307; 315/308
(58) Field of Classification Search .................. 315/307, 315/308, 209 R, 224, 225, 247
See application file for complete search history.

(56) References Cited

U.S. PATENT DOCUMENTS

| 4,724,363 | A * | 2/1988 | Buer .............................. 315/307 |
| 6,437,515 | B1 * | 8/2002 | Kamoi et al. ............. 315/209 R |
| 6,504,323 | B2 | 1/2003 | Yuda et al. |
| 6,791,286 | B2 | 9/2004 | Matsumoto |
| 7,208,882 | B2 | 4/2007 | Ishizuka |
| 7,443,103 | B2 | 10/2008 | Li et al. |
| 7,465,053 | B2 | 12/2008 | Taoka et al. |
| 2005/0123045 | A1 | 6/2005 | Hannuksela |

FOREIGN PATENT DOCUMENTS

| CN | 1643447 A | 7/2005 |
| JP | A-07-045387 | 2/1995 |
| JP | A 10-501919 | 2/1998 |
| JP | A 2002-110392 | 4/2002 |
| JP | A 2003-151786 | 5/2003 |
| JP | A-2004-342388 | 12/2004 |
| JP | A 2005-050662 | 2/2005 |
| JP | A-2005-353343 | 12/2005 |

* cited by examiner

*Primary Examiner* — David Hung Vu
(74) *Attorney, Agent, or Firm* — Oliff & Berridge, PLC (57) ABSTRACT

A method of generating a driving current supplied to a high pressure discharge lamp, including outputting a DC current, converting the DC current to an AC current having a predetermined frequency, generating a reference pulse which is asynchronous with the AC current, and superposing the first pulse and the second pulse to the AC current for producing the driving current.

12 Claims, 5 Drawing Sheets

DISCHARGE LAMP LIGHTING DEVICE AND PROJECTOR

CROSS-REFERENCE TO RELATED APPLICATION

This is a Continuation of application Ser. No. 11/670,752 filed Feb. 2, 2007. This application claims the benefit of Japanese Application No. JP 2006-033490, filed Feb. 10, 2006. The disclosure of the prior applications is hereby incorporated by reference herein in its entirety.

BACKGROUND

1. Technical Field

The present invention relates to a high pressure discharge lamp lighting device and a projector including the same, and more specifically, to a technique for preventing flicker.

2. Related Art

In the related art, for example, the following method is used in a high pressure discharge lamp lighting device used for a light source of a projector in order to stabilize the discharge arc in a high pressure discharge lamp (hereinafter, referred as a lamp): when an AC lamp current is supplied to a high pressure discharge lamp to turn on the high pressure discharge lamp, a current pulse having a period obtained by dividing half the period of the lamp current by a predetermined value is generated, the polarity of the current pulse becomes identical to the polarity of the lamp current, and a latter part of the half period of the current pulse is superposed on the lamp current (for example, JP-T-10-501919 (see claims and FIG. 4).

In the related art, the current pulse is superposed on the AC lamp current in synchronization with a latter part of the half period of the AC lamp current. Therefore, temperature increases in the electrodes in the lamp, and a discharge arc stably occurs, which prevents flicker. When the lamp is used as, for example, a light source of a projector, the brightness on a screen increases for a time corresponding to the superposition of the current pulse on the lamp current, which is an adverse effect. Since the current pulse is synchronously superposed on the lamp current, a partially bright portion is fixed at a predetermined position on the screen, which causes problems that the brightness on the screen is not uniform and a stripe occurs on the display screen.

SUMMARY

An advantage of some aspects of the invention is that it provides a high pressure discharge lamp lighting device capable of preventing flicker and preventing a stripe from occurring on a display screen and a projector including the same.

According to an aspect of the invention, a high pressure discharge lamp lighting device includes: a DC power supply circuit that is supplied with a DC voltage and performs current control to supply a predetermined constant power to a high pressure discharge lamp; an inverter that converts an output current of the DC power supply circuit into an AC current having a predetermined frequency and supplies a driving current to the high pressure discharge lamp; and a control unit that controls the DC power supply circuit and the inverter. In the high pressure discharge lamp lighting device, the control unit superposes a current pulse asynchronous with the driving current on the driving current. In this aspect, the current pulse is superposed on the driving current in order to stabilize the discharge arc occurring in the high pressure discharge lamp, which makes it possible to prevent flicker caused by a variation in the shape of a leading end of the electrodes in the high pressure discharge lamp. In addition, the superposed current pulse is asynchronous with the driving current, and the relationship between the current pulse and the driving current is random. Therefore, even when the high pressure discharge lamp lighting device is used for a projector, the current pulse causes a corresponding portion of the display screen to be bright, but the bright portion is not fixed, which makes it difficult for a viewer to view the bright portion. As a result, the viewer cannot recognize the bright portion as a stripe on the display screen.

In the high pressure discharge lamp lighting device according to this aspect, preferably, the control unit adjusts the width and/or height of the current pulse according to the power supplied to the high pressure discharge lamp. According to the above-mentioned structure, the control unit performs constant power control on the high pressure discharge lamp and adjusts the width and/or height of the current pulse according to the power. Therefore, it is possible to stably generate an AC arc and prevent an excessively large amount of energy from being supplied to the electrodes in the high pressure discharge lamp. As a result, it is possible to prevent the electrodes in the high pressure discharge lamp from wearing off.

In the high pressure discharge lamp lighting device according to the above-mentioned aspect, preferably, the control unit includes a frequency regulator for setting the frequency of the current pulse, and the control unit set the frequency of the current pulse on the basis of the frequency set by the frequency regulator. According to the above-mentioned structure, the control unit sets the frequency of the current pulse on the basis of the frequency set by the frequency modulator. Therefore, the control unit can arbitrarily set the frequency of the current pulse.

In the high pressure discharge lamp lighting device according to the above-mentioned aspect, preferably, the control unit superposes the current pulse on the second half of the pulse width of the driving current. According to the above-mentioned structure, the current pulse is superposed on the second half of the pulse width of the driving current, which makes it possible to effectively stabilize the discharge arc in the high pressure discharge lamp and to prevent flicker.

In the high pressure discharge lamp lighting device according to the above-mentioned structure, preferably, the control unit randomly superposes the current pulse on the second half of the pulse width of the driving current. According to the above-mentioned structure, since the current pulse is superposed on the second half of the pulse width of the driving current, it is possible to effectively stabilize the discharge arc in the high pressure discharge lamp. Even when the high pressure discharge lamp lighting device is used for a projector, the position of the current pulse is not fixed, which makes it possible to prevent flicker on the display screen.

In the high pressure discharge lamp lighting device according to the above-mentioned aspect, preferably, the control unit generates a reference pulse for generating the current pulse, blocks a portion of the reference pulse corresponding to the first half of the pulse width of the driving current, and superposes the current pulse on the second half of the pulse width of the driving current on the basis of the other portions of the reference pulse that are not blocked.

According to another aspect of the invention, a projector includes: a high pressure discharge lamp; the high pressure discharge lamp lighting device according to the above-mentioned aspect; liquid crystal display panels; an optical system that guides light emitted from the high pressure discharge lamp to the liquid crystal display panels; and a projecting unit that projects images displayed on the liquid crystal display panels onto a screen. In the projector, the frequency of a current pulse of the high pressure discharge lamp lighting device is different from the frequencies of vertical synchronization signals of the liquid crystal display panels. According to this aspect of the invention, the frequency of the current pulse of the high pressure discharge lamp lighting device is different from the frequencies of the vertical synchronization signals of the liquid crystal display panels, and the current pulse causes a corresponding portion on the display screen to be bright. However, the current pulse is inserted into a different position of each frame of the display screen, and the bright position is not fixed, which makes it difficult for a viewer to view the bright portion. As a result, the viewer cannot recognize the bright portion as a stripe on the display screen.

BRIEF DESCRIPTION OF THE DRAWINGS

The invention will be described with reference to the accompanying drawings, wherein like numbers refer like elements.

DESCRIPTION OF EXEMPLARY EMBODIMENTS

First Embodiment

Figure 1:
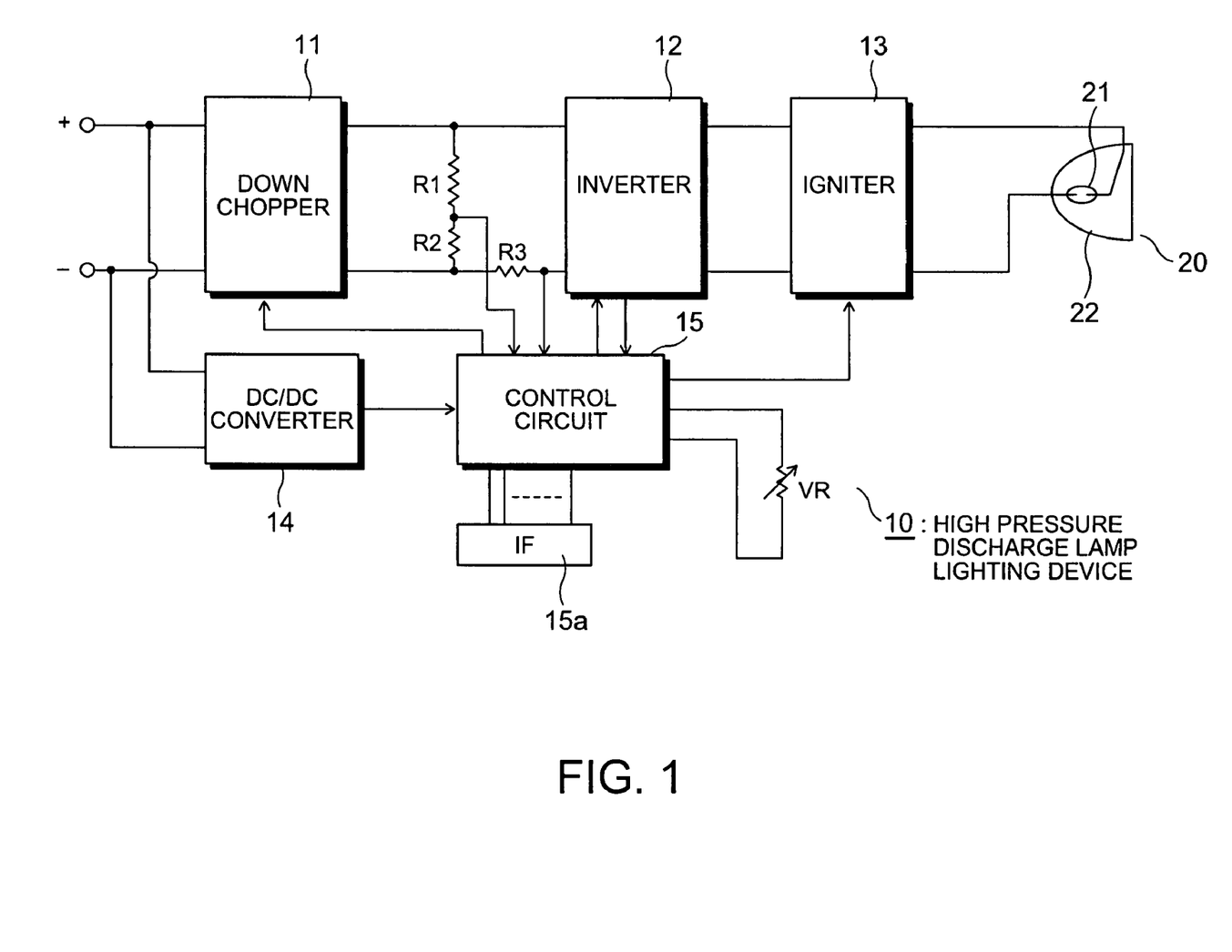
FIG. 1 is a block diagram illustrating the structure of a high pressure discharge lamp lighting device according to a first embodiment of the invention.

FIG. 1 is a block diagram illustrating the structure of a high pressure discharge lamp lighting device according to a first embodiment of the invention. The high pressure discharge lamp lighting device shown in FIG. 1 includes a down chopper 11, an inverter 12, an igniter 13, a DC/DC converter 14, and a control circuit 15. A lamp 20 is connected to output terminals of the igniter 13. The down chopper 11 corresponds to a DC power supply circuit according to the embodiment of the invention and adjusts an input DC voltage to supply a predetermined constant power to the lamp 20. In this embodiment, the down chopper 11 performs a chopper process on an input voltage to drop the input voltage and performs current control to supply a predetermined constant power to the lamp 20. A current output from the down chopper 11 is input to the inverter 12. Resistors R1 and R2 are connected in parallel to output terminals of the down chopper 11, and the potential of a node between the resistors R1 and R2 is supplied to the control circuit 15 as an output voltage of the down chopper 11. A resistor R3 is connected in series to a negative potential side of the down chopper 11. A current flowing through the resistor R3 is detected as a lamp current (driving current) and is supplied to the control circuit 15.

The inverter 12 is composed of, for example, four switching elements connected to one another in a full bridge manner. The inverter 12 alternately switches the four switching elements to convert an input DC voltage to an AC voltage, and the converted AC voltage is output to the igniter 13. The igniter 13 includes, for example, an igniter transformer and a circuit for driving the igniter transformer, and generates a high voltage when turning on the lamp 20 and applies the high voltage to the lamp 20. The DC/DC converter 14 generates a driving voltage for the control circuit 15. The DC/DC converter 14 drops an input voltage and supplies the dropped voltage to the control circuit 15. The control circuit 15 is composed of, for example, a microprocessor, and controls the down chopper 11, the inverter 12, and the igniter 13. The control circuit 15 is supplied with an output voltage and current from the down chopper 11 and controls an output current of the down chopper 11 such that constant power is supplied to the lamp 20. In addition, the control circuit 15 appropriately controls an output frequency of the inverter 12 and controls the igniter 13 to generate a high voltage when turning on the lamp 20. An external control IF 15a for receiving control signals from the outside and a variable resistor VR are connected to the control circuit 15. The variable resistor VR corresponds to a frequency regulator used in the invention, and the variable resistor VR is adjusted to regulate the frequency of current pulses (which will be described later) superposed on the lamp current. The lamp 20 is, for example, a reflective light source device. In the lamp 20, a light-emitting tube 21 is fixed to the center of a reflecting mirror 22 with a heat-resistant cement interposed therebetween.

Next, the operation of the high pressure discharge lamp lighting device shown in FIG. 1 will be described below. The down chopper 11 performs a chopper process on an input DC voltage to drop the input DC voltage and outputs a current corresponding to the dropped DC voltage to the inverter 12. The inverter 12 converts the input DC current into an AC current having a predetermined frequency and outputs the AC current to the igniter 13. The igniter 13 generates a high voltage when the lamp 20 starts to be turned on and supplies the high voltage to the lamp 20. When the lamp 20 is turned on, the output voltage of the inverter 12 is applied to the lamp 20, which causes the lamp to be maintained in the on state. In this case, the control circuit 15 is supplied with the output voltage and output current of the down chopper 11 and controls the down chopper 11 such that constant power is supplied to the lamp 20. However, in this embodiment, in order to stabilize a discharge arc occurring in the lamp 20, the control circuit 15 controls the down chopper 11 such that a current pulse is superposed on a lamp current supplied to the lamp 20. A detailed description thereof will be made with reference to FIG. 2.

FIG. 2 is a timing chart illustrating signal waveforms for generating the lamp current shown in FIG. 1. In FIG. 2, the character A indicates a reference pulse string, and the character B indicates a lamp lighting waveform corresponding to a lamp current (a square-wave current flowing from the inverter to the lamp) without a current pulse string. The character C indicates a pulse string superposed on one polarity of the lamp lighting waveform B, and the character D is a pulse string superposed on the other polarity of the lamp lighting waveform B. Since the polarity of the pulse string D is opposite to the polarity of the pulse string C, the pulse string D is inverted for use. The character F indicates a waveform obtained by superposing the pulses C and E on the lamp lighting waveform B, and a lamp current corresponding to the lamp current waveform F is supplied to the lamp 20. When the high pressure discharge lamp lighting device is applied to a display apparatus, such as a projector, the frequency of the lamp lighting waveform B is set so as to correspond to the frequency (for example, 50 Hz, 60 Hz, or 72 Hz) of a vertical synchronization signal of a display screen (for example, 90

Hz), in order to prolong the life span of the lamp 20. In this embodiment, the frequency of the reference pulse string A is different from the frequency of the lamp lighting waveform B, and the reference pulse string A is set so as not to synchronize with the lamp lighting waveform B. That is, when the pulse strings C and E are superposed on the lamp lighting waveform B to generate the lamp lighting waveform F, the pulse strings C and E are not fixed to a portion of the lamp lighting waveform F. Therefore, the frequency of the reference pulse string A is set in the range of 74 Hz to 88 Hz. The superposition of the pulse strings C and E causes the brightness of the lamp 20 to be high at that time, but the pulse strings C and E are not fixed to a portion of the lamp lighting waveform F. Therefore, when the high pressure discharge lamp lighting device is used as a light source of a projector, a bright position of the projector is not fixed, but is moved, which makes it difficult for a viewer to recognize the bright position on the entire display screen. As a result, the viewer does not care about the brightness on the display screen.

Figure 2A:
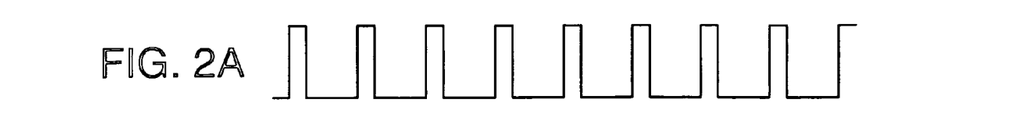
FIGS. 2A-F are timing charts illustrating signal waveforms for generating a lamp current shown in FIG. 1.
Figure 2B:
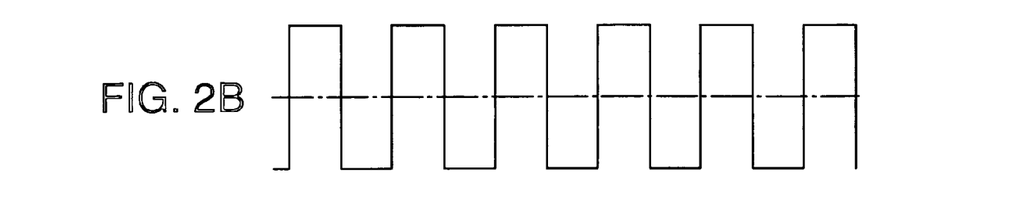
Figure 2C:
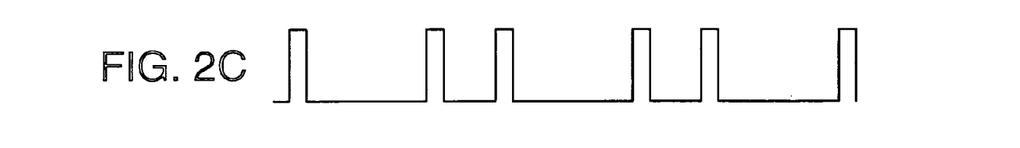
Figure 2D:
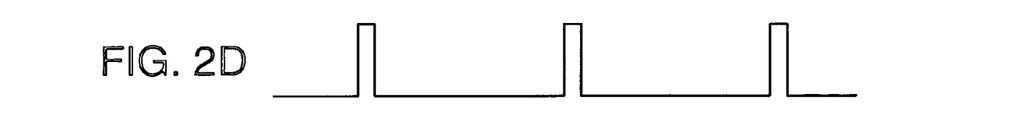
Figure 2E:
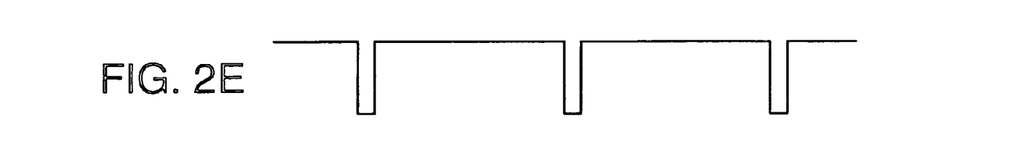
Figure 2F:
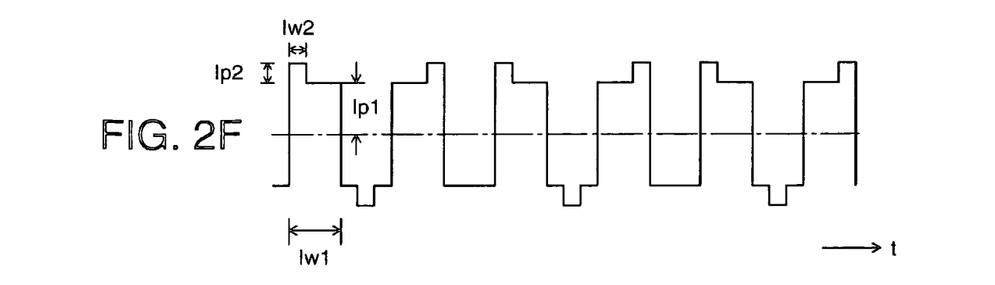

Therefore, as described above, in order to superpose current pulses to obtain a lamp current corresponding to the lamp lighting waveform F, the control circuit 15 makes a control instruction value when controlling the output current of the down chopper 11 have the lamp lighting waveform F, or reduces the feedback amount of the current output from the down chopper 11 by the superposed current pulse.

The control circuit 15 changes the width and height of the superposed current pulse of the lamp lighting pulse F on the basis of the power supplied to the lamp 20. For example, the width Iw2 and the height Ip2 of the superposed current pulse are set to about 5% of the width Iw1 and the height Ip1 of a portion of the lamp power, which is a reference value, corresponding to the lamp lighting waveform B, respectively, and are appropriately changed according to a variation in the lamp power. When the width and height of the current pulse are excessively small, an unstable AC arc is generated. Therefore, in order to generate a stable AC arc, the width and/or height of the current pulse are adjusted to have suitable values and the adjusted values are supplied. When the current pulse has excessively large width and height, an excessively large amount of energy is supplied to the electrodes in the lamp 20, and the electrodes wear off. In order to prevent the electrodes from wearing off, the width and height of the current pulse are adjusted to have suitable values and the adjusted values are supplied. In addition, the frequency of the reference pulse string A can be adjusted to an arbitrary value by adjusting the resistance of the variable resistor VR. For example, it is possible to adjust the resistance of the variable resistor VR while viewing the display screen for a projector.

Figure 3:
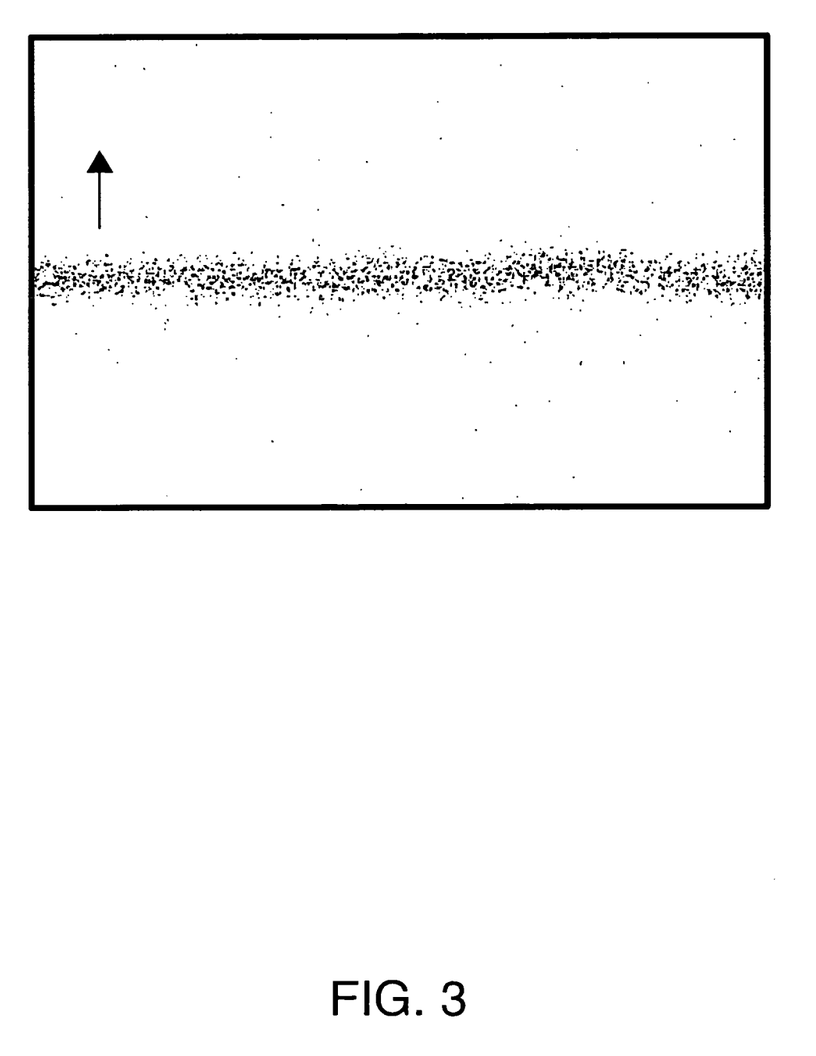
FIG. 3 is a drawing illustrating an example of a display screen when the high pressure discharge lamp lighting device shown in FIG. 1 is used as a light source of a projector.
Figure 4A:
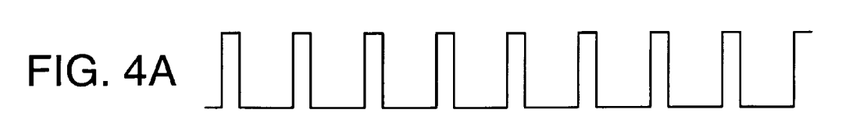
FIGS. 4A-F are timing charts illustrating signal waveforms for generating the lamp current shown in FIG. 1.
Figure 4B:
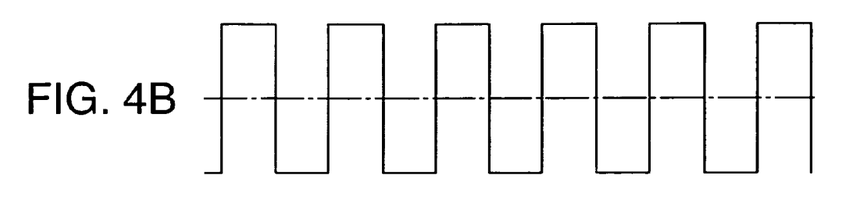
Figure 4C:
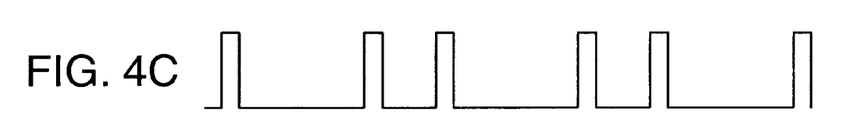
Figure 4E:
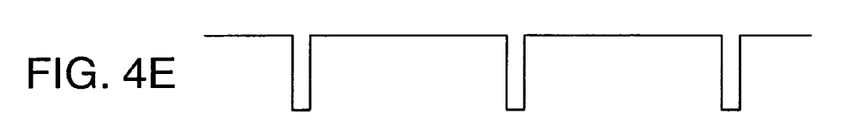
Figure 4F:
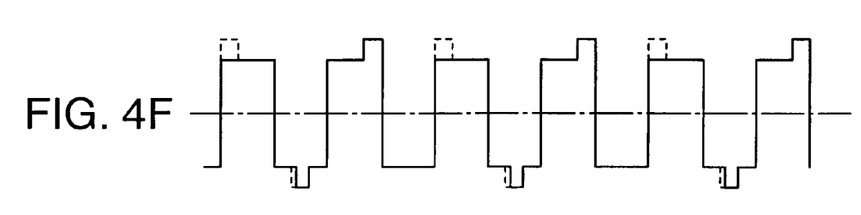
Figure 4G:
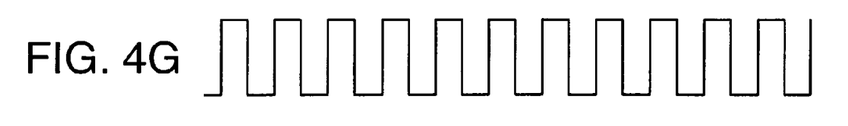

FIG. 3 is a drawing illustrating an example of a display screen when the high pressure discharge lamp lighting device shown in FIG. 1 is used as a light source of a projector. As shown in FIG. 3, a sparse belt (bright portion) like fog is not fixed at a predetermined position, but is repeatedly moved in the vertical direction, which makes it difficult for a viewer to view the belt. As a result, it seems that no stripe occurs on the display screen (the bright portion like belt is not recognized as a stripe), and thus the viewer is not bothered by the stripe on the display screen. In the related art (JP-T-10-501919), since the current pulse string synchronizes with the lamp lighting waveform, the sparse belt shown in FIG. 3 is displayed at a fixed position on the screen and displayed as a stripe at a predetermined position, and thus the viewer can not view the screen cleanly.

In the above-described first embodiment, the current pulse is superposed on the lamp current in order to stabilize the discharge arc occurring in the lamp 20, which makes it possible to prevent flicker caused by the deterioration of the quality of the lamp 20 over time. In addition, the superposed current pulse does not synchronize with the lamp current, and the relationship between the current pulse and the lamp current is random. Even when the high pressure discharge lamp lighting device is used for, for example, a projector, the superposed current pulse causes a corresponding portion of the display screen to be bright, but the bright position is not fixed, which makes it difficult for a viewer to recognize the bright portion. As a result, a stripe does not appear on the display screen.

Second Embodiment

FIG. 4 is a timing chart illustrating another example of the signal waveforms for generating the lamp current shown in FIG. 1. In FIG. 4, the character G indicates a mask pattern. When pulses in pulse strings C and E are disposed at the first half of the pulse width of a lamp lighting waveform B, such pulses are masked by the mask pattern G. Only when pulses in the pulse strings C and E are disposed at the second half of the pulse width of the lamp lighting waveform B, such pulses are superposed on the lamp lighting waveform B. In this way, the pulse strings C and E are superposed on the second half of the pulse width of the lamp lighting waveform B to generate a lamp lighting waveform F. Since the position of the superposed pulse string is not fixed, the same effect as that in the first embodiment can be obtained. In addition, the current pulse is superposed on the second half of the pulse width of the lamp current, which makes it possible to stabilize the discharge arc of the lamp 20 and thus effectively prevent flicker.

Third Embodiment

Figure 5:
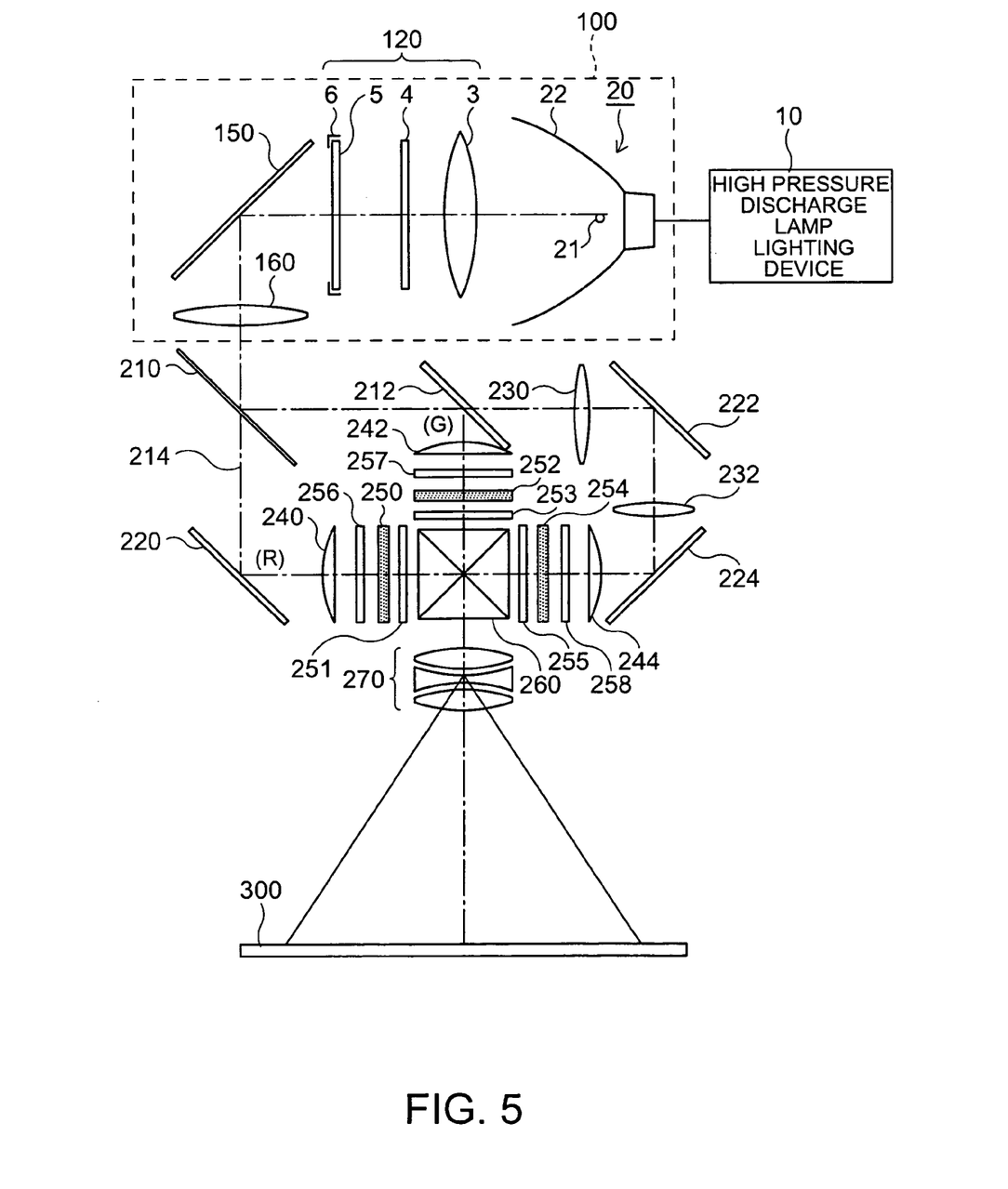
FIG. 5 is a diagram illustrating the structure of an optical system of a projector incorporating the high pressure discharge lamp lighting device according to the first embodiment with an illumination optical system.

FIG. 5 is a diagram illustrating the structure of an optical system of a projector, which is an assembly of the high pressure discharge lamp lighting device according to the first or second embodiment and an illustration optical system. A high pressure discharge lamp lighting device 10 shown in FIG. 5 corresponds to the high pressure discharge lamp lighting device 10 shown in FIG. 1. In this embodiment, the frequency of the superposed current pulse differs from the frequency of the driving current of the lamp 20 and the frequencies of vertical synchronization signals of liquid crystal display panels 250, 252, and 254.

The projector includes an illustration optical system 100, dichroic mirrors 210 and 212, reflecting mirrors 220, 222, and 224, an incident-side lens 230, a relay lens 232, three field lenses 240, 242, and 244, three liquid crystal display panels 250, 252, and 254, polarizing plates 251, 253, 255, 256, 257, and 258 arranged on the emission sides and the incident sides of the liquid crystal display panels, a cross dichroic prism 260, and a projection lens 270.

The illumination optical system 100 includes a high pressure discharge lamp 20 for emitting a substantially parallel light beam, an illuminating device 120, a reflecting mirror 150, and a condenser lens 160. The high pressure discharge lamp 20 is composed of a light-emitting tube 21 (see FIG. 1), serving as a radial light source for emitting a radial light beam. The light beam emitted from the high pressure discharge lamp 20 is incident on the illuminating device 120, and the illuminating device 120 emits a light beam having uniform brightness. The light beam is reflected from the reflecting mirror 150 to be incident on the condenser lens 160. The condenser lens 160 makes the light beam having uniform brightness that is emitted from the illustrating device 120 incident on the liquid crystal display panels 250, 252, and 254.

The two dichroic mirrors 210 and 212 form a color light separating optical system 214 that separates the light emitted from the illumination optical system 100 into three light beams, that is, a red (R) light beam, a green (G) light beam, and a blue (B) light beam. The first dichroic mirror 210 transmits the red light beam of the light beams emitted from the illumination optical system 100, but reflects the blue light beam and the green light beams.

The red light beam passing through the first dichroic mirror 210 is reflected from the reflecting mirror 220 to be incident on the red liquid crystal display panel 250 through the field lens 240. The field lens 240 has a function of condensing light beams such that the light beams are parallel to the main light beam (central axis) of the light beams. The other field lenses 242 and 244 provided in front of the corresponding liquid crystal display panels have the same function as the field lens 240.

Of the blue light beam and the green light beam reflected from the first dichroic mirror 210, the green light beam is reflected from the second dichroic mirror 212 to be incident on the green liquid crystal display panel 252 through the field lens 242. Meanwhile, the blue light beam passes through the second dichroic mirror 212 and further passes through a relay lens system including the incident-side lens 230, the relay lens 232, and the reflecting mirrors 222 and 224. The blue light beam passing through the relay lens system is incident on the blue liquid crystal display panel 254 through the field lens 244.

The three liquid crystal display panels 250, 252, and 254 serve as light modulating devices for converting the incident red, green, and blue light beams into light components for forming an image on the basis of input image signals. The polarizing plates 256, 257, and 258 are provided on the incident sides of the liquid crystal display panels 250, 252, and 254, respectively, and the polarizing plates 251, 253, and 255 are provided on the emission sides of the liquid crystal display panels 250, 252, and 254, respectively. The polarizing plates adjust the polarizations of the red, green, and blue light beams. The light beams passing through the liquid crystal display panels 250, 252, and 254 are incident on the cross dichroic prism 260.

The cross dichroic prism 260 serves as a color combining optical system for combining the red, green, and blue light beams emitted from the three liquid crystal display panels 250, 252, and 254. In the cross dichroic prism 260, a dielectric multi-layer film for reflecting the red light beam and a dielectric multi-layer film for reflecting the blue light beam are provided at interfaces among four right-angled prisms in a substantially X shape. The dielectric multi-layer films combine three color light beams to form a combined light beam for projecting a color image. The combined light beam generated by the cross dichroic prism 260 is incident on the projection lens 270, and is then projected onto a projection screen 300. In this way, the images displayed by the liquid crystal display panels 250, 252, and 254 are projected onto the projection screen 300.

As described above, in the third embodiment, the frequency of the superposed current pulse of the discharge lamp lighting device differs from the frequency of the lamp current of the lamp 20 and the frequencies of the vertical synchronization signals of the liquid crystal display panels 250, 252, and 254. Therefore, the superposed current pulse causes a corresponding portion of the display screen to be bright, but the bright position is not fixed, which makes it difficult for a viewer to recognize the bright portion. As a result, a stripe does not appear on the display screen.

What is claimed is:

1. A method of generating a driving current supplied to a high pressure discharge lamp, the method comprising:
   outputting a DC current;
   converting the DC current to an AC current having a predetermined frequency;
   generating a reference pulse which is asynchronous with the AC current;
   generating a first pulse from the reference pulse, the first pulse being superposed on the AC current when a polarity of the AC current is positive;
   generating a second pulse from the reference pulse, the second pulse being superposed on the AC current when the polarity of the AC current is negative; and
   superposing the first pulse and the second pulse to the AC current for producing the driving current.

2. The method according to claim 1, further comprising:
   detecting a voltage of the DC current;
   detecting a current of the driving current;
   calculating a power supplied to the high pressure discharge lamp based on the voltage of the DC current and the current of the driving current; and
   adjusting a width and/or height of the reference pulse according to the power supplied to the high pressure discharge lamp.

3. The method according to claim 1, further comprising:
   generating a mask pattern which masks a first half of pulse width of the AC current; and
   superposing pulse strings on the AC current, the pulse strings produced by masking the first pulse and the second pulse with the mask pattern.

4. The method according to claim 2, further comprising:
   generating a mask pattern which masks a first half of pulse width of the AC current; and
   superposing pulse strings on the AC current, the pulse strings produced by masking the first pulse and the second pulse with the mask pattern.

5. The method according to claim 1, further comprising:
   adjusting a width and/or height of the reference pulse according to a power supplied to the high pressure discharge lamp.

6. The method according to claim 5, further comprising:
   generating a mask pattern which masks a first half of pulse width of the AC current; and
   superposing pulse strings on the AC current, the pulse strings produced by masking the first pulse and the second pulse with the mask pattern.

7. A method of generating a driving current supplied to a high pressure discharge lamp, the method comprising:
   outputting a DC current;
   converting the DC current to an AC current having a predetermined frequency;
   generating a reference pulse which is asynchronous with the AC current; and
   superposing a first pulse and a second pulse to the AC current for producing the driving current.

8. The method according to claim 7, further comprising:
   detecting a voltage of the DC current;
   detecting a current of the driving current;
   calculating a power supplied to the high pressure discharge lamp based on the voltage of the DC current and the current of the driving current; and
   adjusting a width and/or height of the reference pulse according to the power supplied to the high pressure discharge lamp.

9. The method according to claim 7, further comprising:
generating a mask pattern which masks a first half of pulse width of the AC current;
generating the first pulse from the reference pulse, the first pulse being superposed on the AC current when a polarity of the AC current is positive;
generating the second pulse from the reference pulse, the second pulse being superposed on the AC current when the polarity of the AC current is negative; and
superposing pulse strings on the AC current, the pulse strings produced by masking the first pulse and the second pulse with the mask pattern.

10. The method according to claim 8, further comprising:
generating a mask pattern which masks a first half of pulse width of the AC current;
generating the first pulse from the reference pulse, the first pulse being superposed on the AC current when a polarity of the AC current is positive;
generating the second pulse from the reference pulse, the second pulse being superposed on the AC current when the polarity of the AC current is negative; and
superposing pulse strings on the AC current, the pulse strings produced by masking the first pulse and the second pulse with the mask pattern.

11. The method according to claim 7, further comprising:
adjusting a width and/or height of the reference pulse according to a power supplied to the high pressure discharge lamp.

12. The method according to claim 7, further comprising:
generating a mask pattern which masks a first half of pulse width of the AC current;
generating the first pulse from the reference pulse, the first pulse being superposed on the AC current when a polarity of the AC current is positive;
generating the second pulse from the reference pulse, the second pulse being superposed on the AC current when the polarity of the AC current is negative; and
superposing pulse strings on the AC current, the pulse strings produced by masking the first pulse and the second pulse with the mask pattern.

* * * * *